United States Patent
Crotty et al.

(10) Patent No.: US 10,159,374 B1
(45) Date of Patent: Dec. 25, 2018

(54) CHRISTMAS TREE STAND

(71) Applicants: Michael Crotty, Middletown, NJ (US);
Melissa Moran, Middletown, NJ (US)

(72) Inventors: Michael Crotty, Middletown, NJ (US);
Melissa Moran, Middletown, NJ (US)

( * ) Notice: Subject to any disclaimer, the term of this patent is extended or adjusted under 35 U.S.C. 154(b) by 0 days.

(21) Appl. No.: 15/919,334

(22) Filed: Mar. 13, 2018

(51) Int. Cl.
*F16M 13/00* (2006.01)
*A47G 33/12* (2006.01)
*B62B 13/00* (2006.01)

(52) U.S. Cl.
CPC .............. *A47G 33/12* (2013.01); *B62B 13/00* (2013.01)

(58) Field of Classification Search
USPC ........................................................ 248/519
See application file for complete search history.

(56) References Cited

U.S. PATENT DOCUMENTS

| | | | | |
|---|---|---|---|---|
| 1,065,876 | A * | 6/1913 | Kennard ................ | B62B 15/00 280/24 |
| D112,958 | S * | 1/1939 | Lynch ............................ | D12/10 |
| D182,595 | S | 4/1958 | Jackson | |
| 3,224,660 | A * | 12/1965 | Willis .................. | B65D 81/368 229/116.3 |
| 4,156,323 | A * | 5/1979 | Scheffler ............ | A47G 33/1213 248/516 |
| 4,190,979 | A * | 3/1980 | Singer ...................... | A63H 3/52 280/845 |
| D264,282 | S * | 5/1982 | Blavat .......................... | D11/125 |
| 4,571,881 | A * | 2/1986 | Lathim .................. | A47G 33/12 248/527 |
| 4,730,569 | A | 3/1988 | Colson | |
| 5,702,086 | A | 12/1997 | Hunt | |
| D401,529 | S * | 11/1998 | Lippert ........................ | D11/125 |
| 6,102,357 | A * | 8/2000 | Papadatos .......... | A47G 33/1226 248/516 |
| 6,510,649 | B2 | 1/2003 | Nosker | |
| 8,146,291 | B2 * | 4/2012 | Noblett .................. | A47G 33/12 47/40.5 |
| 2005/0051695 | A1 * | 3/2005 | Kovach .................. | A47G 33/12 248/524 |
| 2014/0026477 | A1 * | 1/2014 | Ferguson ............... | A47G 33/12 47/40.5 |

FOREIGN PATENT DOCUMENTS

GB 2343622 A 5/2000

* cited by examiner

*Primary Examiner* — Monica E Millner
(74) *Attorney, Agent, or Firm* — Kyle A. Fletcher, Esq.

(57) ABSTRACT

The Christmas tree stand is a structure that supports a Christmas tree. The Christmas tree stand has a body with the appearance of a sled. The Christmas tree stand comprises a plurality of rails, a platform, a tree support, and a plurality of threaded fasteners. The plurality of rails, the platform, the tree support, and the plurality of threaded fasteners are interconnected to form a supporting structure with the sled appearance. The plurality of rails forms a framework that provides vertical support for the Christmas tree stand. The platform is a horizontal surface used for supporting objects above the supporting surface on which the Christmas tree stand rests. The tree support is a structure, which receives and support the Christmas tree. The plurality of threaded fasteners is a threaded fastener, which secures the Christmas tree in the tree support.

16 Claims, 4 Drawing Sheets

CHRISTMAS TREE STAND

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles including religious and ritual equipment, more specifically, a Christmas tree stand.

SUMMARY OF INVENTION

The Christmas tree stand is configured for use with a Christmas tree. The Christmas tree stand is a structure that supports the Christmas tree. The Christmas tree stand has a body with the appearance of a sled. The Christmas tree stand comprises a plurality of rails, a platform, a tree support, and a plurality of threaded fasteners. The plurality of rails, the platform, the tree support, and the plurality of threaded fasteners are interconnected to form a supporting structure with the sled appearance. The plurality of rails forms a framework that provides vertical support for the Christmas tree stand. The platform is a horizontal surface used for supporting objects above the supporting surface on which the Christmas tree stand rests. The tree support is a structure which receives and support the Christmas tree. The plurality of threaded fasteners is a threaded fastener which secures the Christmas tree in the tree support.

These together with additional objects, features and advantages of the Christmas tree stand will be readily apparent to those of ordinary skill in the art upon reading the following detailed description of the presently preferred, but nonetheless illustrative, embodiments when taken in conjunction with the accompanying drawings.

In this respect, before explaining the current embodiments of the Christmas tree stand in detail, it is to be understood that the Christmas tree stand is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the Christmas tree stand.

It is therefore important that the claims be regarded as including such equivalent construction insofar as they do not depart from the spirit and scope of the Christmas tree stand. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
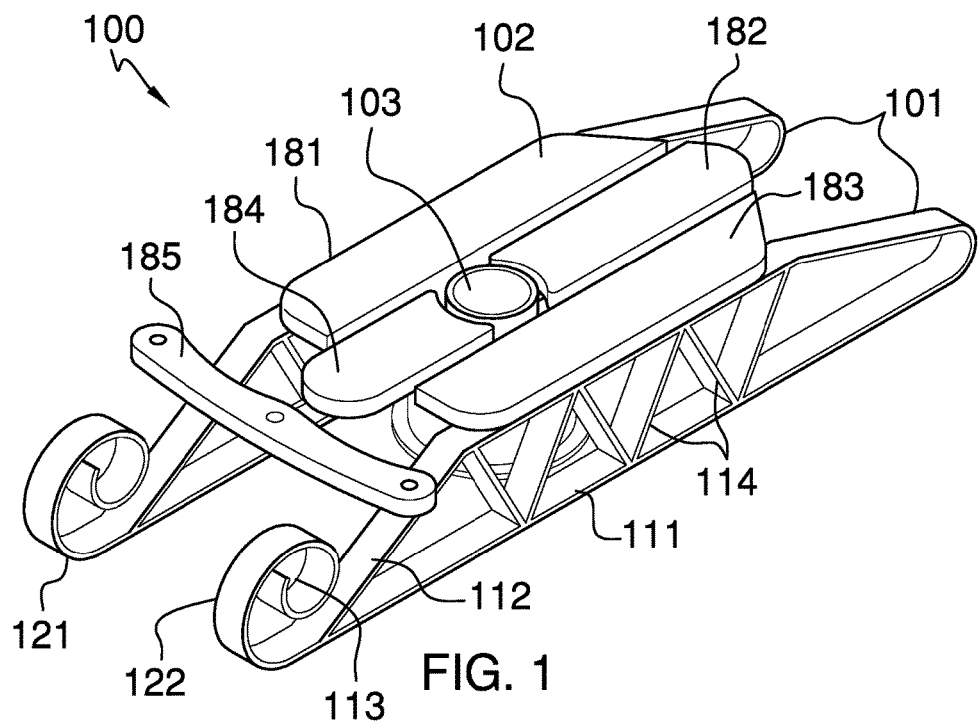
FIG. 1 is a perspective view of an embodiment of the disclosure.
Figure 2:
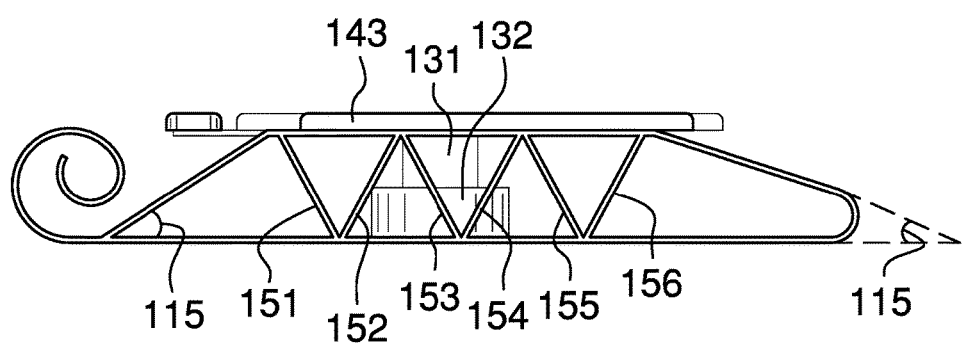
FIG. 2 is a side view of an embodiment of the disclosure.
Figure 3:
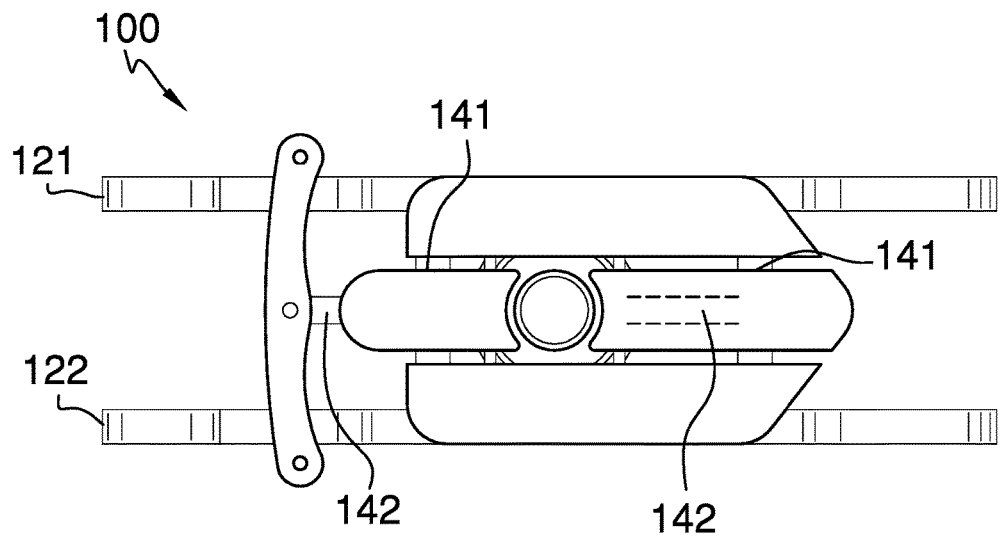
FIG. 3 is a top view of an embodiment of the disclosure.
Figure 4:
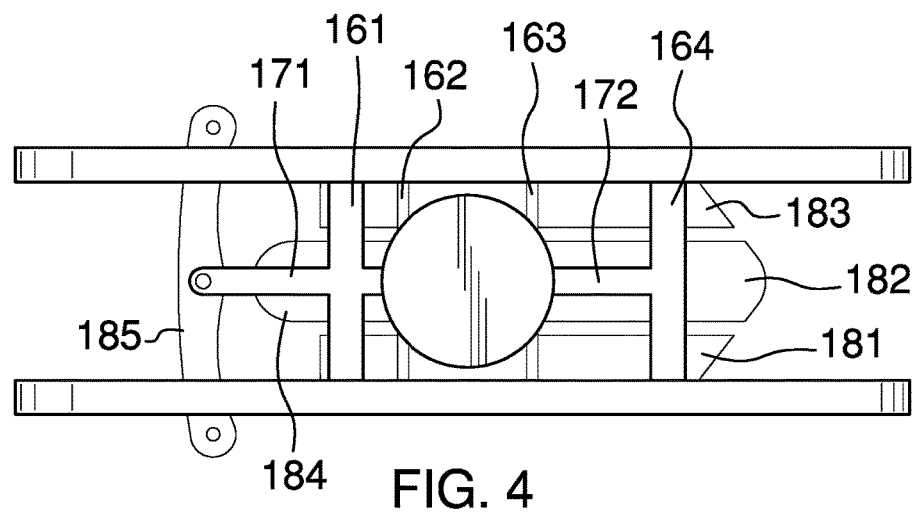
FIG. 4 is a bottom view of an embodiment of the disclosure.
Figure 5:
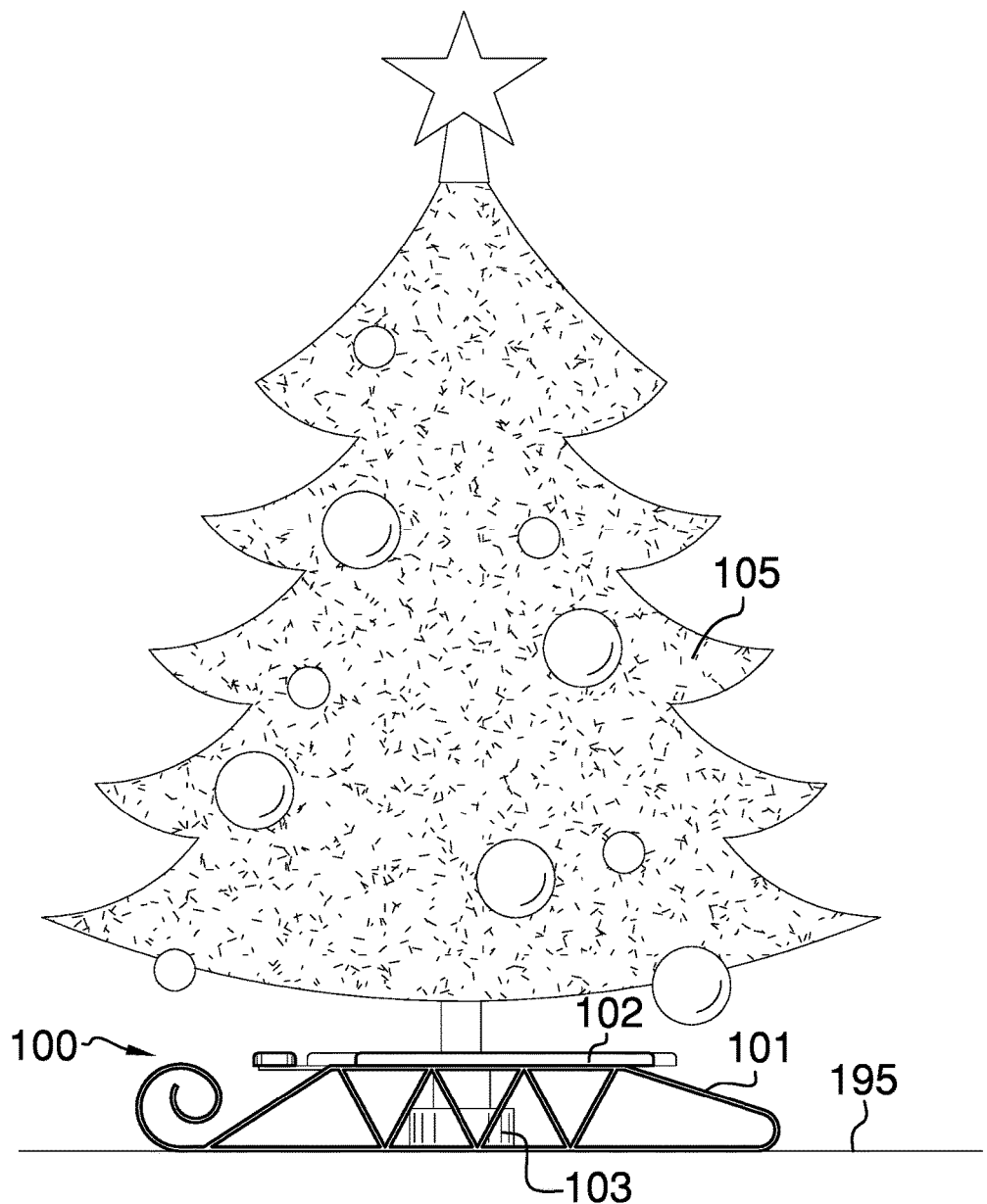
FIG. 5 is an in-use view of an embodiment of the disclosure.
Figure 6:
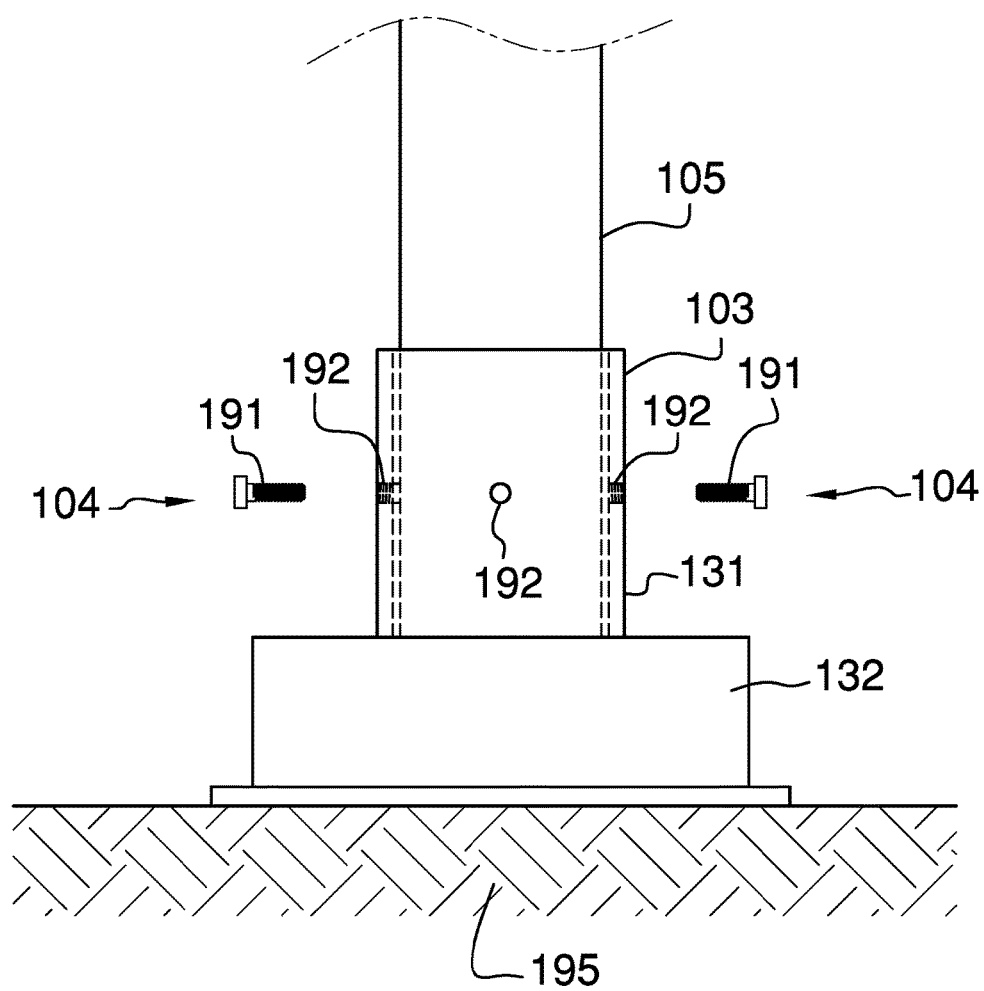
FIG. 6 is a detail view of an embodiment of the disclosure.

Detailed reference will now be made to one or more potential embodiments of the disclosure, which are illustrated in FIGS. 1 through 6.

The Christmas tree stand 100 (hereinafter invention) is configured for use with a Christmas tree 105. The invention 100 is a structure that supports the Christmas tree 105. The Christmas tree 105 is a decorated tree used for religious and celebratory purposes. The Christmas tree 105 may be natural or artificial. The traditional Christmas tree 105 has the appearance of an evergreen tree. The invention 100 has a structure with the appearance of a sled.

The invention 100 comprises a plurality of rails 101, a platform 102, a tree support 103, and a plurality of threaded fasteners 104. The invention 100 is further defined with a center axis 196 that aligns with the primary sense of direction of the sled. The plurality of rails 101, the platform 102, the tree support 103, and the plurality of threaded fasteners 104 are interconnected to form a supporting structure with the sled appearance. The plurality of rails 101 forms a framework that provides vertical support for the invention 100. The platform 102 is a horizontal surface used for supporting objects above the supporting surface 195 on which the invention 100 rests. The tree support 103 is a structure, which receives and supports the Christmas tree 105. The plurality of threaded fasteners 104 is a threaded fastening system, which secures the Christmas tree 105 in the tree support 103.

Each of the plurality of rails 101 is a truss structure. Each of the plurality of rails 101 is identical. The plurality of rails 101 are configured to resemble the rails of a sled. The plurality of rails 101 forms a vertical support structure that raises the platform 102 above the supporting surface 195. The plurality of rails 101 further forms a protective barrier around the base of the Christmas tree 105. Each of the plurality of rails 101 comprises a runner 111, a riser 112, a bow structure 113, a plurality of gussets 114, and a riser cant 115.

The runner 111 forms the inferior boundary of each of the plurality of rails 101. The runner 111 is a flat bar that rests upon the supporting surface 195.

The riser 112 is a flat bar that forms the superior boundary of each of the plurality of rails 101. The riser 112 is a single structure that forms what are commonly called the two end posts and the top chord of the truss structure formed by each of the plurality of rails 101. The riser 112 provides the vertical support that raises the platform 102 above the supporting surface 195.

The riser cant 115 refers to the angle formed between the runner 111 and the riser 112 at the joints that attach the runner 111 and the riser 112. In the first potential embodiment of the disclosure, the span of the arc of the anterior riser cant 115 equals the span of the arc of the posterior riser cant 115.

The bow structure 113 is a spiral structure formed on the anterior joint attaching the runner 111 and the riser 112. The bow structure 113 is a decorative extension of the runner 111.

The plurality of gussets 114 forms a series of adjacent triangular structures that provide structural support between the runner 111 and the riser 112. The plurality of gussets 114 forms the bulk of the load path between the platform 102 and the supporting surface 195. None of the plurality of gussets 114 are perpendicular to the force of gravity. None of the plurality of gussets 114 are parallel to the force of gravity.

The plurality of gussets 114 comprises a first gusset 151, a second gusset 152, a third gusset 153, a fourth gusset 154, a fifth gusset 155, and a sixth gusset 156.

The first gusset 151 is a flat bar that attaches the runner 111 to the riser 112. The second gusset 152 is a flat bar that attaches the runner 111 to the riser 112. The third gusset 153 is a flat bar that attaches the runner 111 to the riser 112. The fourth gusset 154 is a flat bar that attaches the runner 111 to the riser 112. The fifth gusset 155 is a flat bar that attaches the runner 111 to the riser 112. The sixth gusset 156 is a flat bar that attaches the runner 111 to the riser 112.

The first gusset 151, the runner 111, and the riser 112 forms a triangle within the truss structure of each of the plurality of rails 101. The sixth gusset 156, the runner 111, and the riser 112 forms a triangle within the truss structure of each of the plurality of rails 101.

The second gusset 152, the runner 111, and the third gusset 153 forms a triangle within the truss structure of each of the plurality of rails 101. The third gusset 153, the riser 112, and the fourth gusset 154 forms a triangle within the truss structure of each of the plurality of rails 101. The fourth gusset 154, the runner 111, and the fifth gusset 155 forms a triangle within the truss structure of each of the plurality of rails 101. The fifth gusset 155, the riser 112, and the sixth gusset 156 forms a triangle within the truss structure of each of the plurality of rails 101.

The plurality of rails 101 further comprises a dexter rail 121 and a sinister rail 122. The dexter rail 121 is the rail selected from the plurality of rails 101 that is on the right side of the invention 100 when the invention 100 is viewed from the posterior side. The sinister rail 122 is the rail selected from the plurality of rails 101 that is on the left side of the invention 100 when the invention 100 is viewed from the posterior side.

The platform 102 is a horizontal surface that forms the superior surface of the invention 100. The platform 102 supports decorative items above the supporting surface 195. The platform 102 further comprises an aperture that allows the Christmas tree 105 to be inserted through the platform 102 into the tree support 103. The platform 102 comprises a plurality of lateral beams 141, a plurality of medial beams 142, and a plurality of horizontal plates 143.

Each of the plurality of lateral beams 141 is a flat bar that attaches the riser 112 of the dexter rail 121 to the riser 112 of the sinister rail 122. Each of the plurality of lateral beams 141 are perpendicular to the riser 112 of both the dexter rail 121 and the sinister rail 122. Each of the plurality of lateral beams 141 are identical. Each of the plurality of lateral beams 141 are perpendicular to the center axis 196 of the invention 100. The plurality of lateral beams 141 comprises a first lateral beam 161, a second lateral beam 162, a third lateral beam 163, and a fourth lateral beam 164.

The first lateral beam 161 is a flat bar that attaches the dexter rail 121 to the sinister rail 122. The second lateral beam 162 is a flat bar that attaches the dexter rail 121 to the sinister rail 122. The third lateral beam 163 is a flat bar that attaches the dexter rail 121 to the sinister rail 122. The fourth lateral beam 164 is a flat bar that attaches the dexter rail 121 to the sinister rail 122. The order of installation of the plurality of lateral beams 141 from the anterior to the posterior of the invention 100 is the first lateral beam 161, the second lateral beam 162, the third lateral beam 163, and the fourth lateral beam 164.

Each of the plurality of medial beams 142 is a flat bar that attaches to two adjacent lateral beams selected from the plurality of lateral beams 141. Each of the plurality of medial beams 142 are perpendicular to each lateral beam selected from the plurality of lateral beams 141. Each of the plurality of medial beams 142 are parallel to the center axis 196 of the invention 100. The plurality of medial beams 142 comprises a first medial beam 171 and a second medial beam 172. The first medial beam 171 is a flat bar that attaches to the first lateral beam 161 and the second lateral beam 162. The second medial beam 172 is a flat bar that attaches to the third lateral beam 163 and the fourth lateral beam 164.

Each of the plurality of horizontal plates 143 is a plate structure. The plurality of horizontal plates 143 forms the superior horizontal surface of the invention 100 upon which the decorative items are placed. Each of the plurality of horizontal plates 143 are supported by two or more beams selected from the group consisting of: 1) the plurality of lateral beams 141; 2) the plurality of medial beams 142; or 3) the combination of the plurality of lateral beams 141 and the plurality of medial beams 142. The plurality of horizontal plates 143 comprises a first horizontal plate 181, a second horizontal plate 182, a third horizontal plate 183, a fourth horizontal plate 184, and a fifth horizontal plate 185.

The first horizontal plate 181 attaches to the superior surfaces of the first lateral beam 161, the second lateral beam 162, the third lateral beam 163 and the fourth lateral beam 164. The first horizontal plate 181 is proximal to the dexter rail 121. The second horizontal plate 182 attaches to the superior surfaces of the third lateral beam 163, the fourth lateral beam 164, and the second medial beam 172. The second horizontal plate 182 is positioned between the first horizontal plate 181 and the third horizontal plate 183.

The third horizontal plate 183 attaches to the superior surfaces of the first lateral beam 161, the second lateral beam 162, the third lateral beam 163 and the fourth lateral beam 164. The third horizontal plate 183 is proximal to the sinister rail 122. The fourth horizontal plate 184 attaches to the superior surfaces of the first lateral beam 161, the second lateral beam 162, and the first medial beam 171. The fourth horizontal plate 184 is positioned between the first horizontal plate 181 and the third horizontal plate 183.

The fifth horizontal plate 185 is a decorative structure that attaches to the dexter rail 121, the sinister rail 122, and the first medial beam 171. The fifth horizontal plate 185 is anterior relative to the first horizontal plate 181, the fourth horizontal plate 184 and the third horizontal plate 183.

The tree stand 131 is positioned between the first horizontal plate 181, the second horizontal plate 182, the third horizontal plate 183, and the fourth horizontal plate 184 such that the Christmas tree 105 inserts into the tree stand 131. The tree support 103 supports the Christmas tree 105 in a vertical orientation that emulates the Christmas tree 105 in a natural environment. The tree support 103 receives the base of the Christmas tree 105 through the platform 102. The tree support 103 comprises a tree stand 131 and a pedestal 132.

The tree stand 131 is a hollow prism-shaped pipe. The tree stand 131 is sized to receive the base of the Christmas tree 105. The tree stand 131 supports the Christmas tree 105 such that the Christmas tree 105 stands vertically from the tree stand 131 in a perpendicular direction to the platform 102. Wherein in the first potential embodiment of the disclosure, the tree stand 131 is cylindrical in shape.

The pedestal 132 is a prism-shaped structure. The pedestal 132 is geometrically similar to the tree stand 131. The tree stand 131 attaches to the pedestal 132. The span of the perimeter of the pedestal 132 is greater than the span of the perimeter of the tree stand 131. The greater surface area of the pedestal 132 prevents the Christmas tree 105 from tipping over the tree support 103.

The plurality of threaded fasteners 104 is a collection of fastening devices that secure the Christmas tree 105 to the tree support 103. The plurality of threaded fasteners 104 comprises a plurality of bolts 191 and a plurality of threaded apertures 192.

Each of the plurality of threaded apertures 192 is an aperture that is formed through the face of the tree stand 131. Each of the plurality of threaded apertures 192 is formed with an interior screw thread. Each of the plurality of threaded apertures 192 are identical. Each of the plurality of bolts 191 is a shaft that is formed with an exterior screw thread. Each of the plurality of bolts 191 is a commercially available product that is sized to screw into any threaded aperture selected from the plurality of bolts 191. Each of the plurality of bolts 191 are identical. Each of the plurality of bolts 191 is screwed through a threaded aperture selected from the plurality of threaded apertures 192 and directly into the Christmas tree 105.

The following definitions were used in this disclosure:

Anterior: As used in this disclosure, anterior is a term that is used to refer to the front side or direction of an object. When comparing two objects, the anterior object is the object that is closer to the front of the object.

Beam: As used in this disclosure, a beam is a horizontally oriented shaft that: 1) is suspended above a supporting surface; and, 2) bears a load.

Bolt: As used in this disclosure, a bolt is a cylindrical shaft formed with an exterior screw thread. A bolt is defined with an outer diameter.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis of an object refers to a line that: 1) runs through the center of the object; and, 2) is parallel to the primary sense of direction of the object.

Correspond: As used in this disclosure, the term correspond is used as a comparison between two or more objects wherein one or more properties shared by the two or more objects match, agree, or align within acceptable manufacturing tolerances.

Cylinder: As used in this disclosure, a cylinder is a geometric structure defined by two identical flat and parallel ends, also commonly referred to as bases, which are circular in shape and connected with a single curved surface, referred to in this disclosure as the lateral face. The cross-section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends. The cylinder is considered to be a prism.

Decorative: As used in this disclosure, the term decorative is used to describe a design decision or feature that is made for aesthetic purposes and is not anticipated to materially affect the novelty of the innovation described in this disclosure.

Dexter: As used in this disclosure, dexter is a directional reference that refers to the right side of the body or the right side of an object from the perspective of a viewer who is facing the posterior side of the object.

Elevation: As used in this disclosure, elevation refers to the span of the distance in the superior direction between a specified horizontal surface and a horizontal reference surface.

Exterior Screw Thread: An exterior screw thread is a ridge wrapped around the outer surface of a tube in the form of a helical structure that is used to convert rotational movement into linear movement.

Flat Bar: As used in this disclosure, a flat bar is a rectangular block structure that presents a low elevation profile when placed on a supporting surface. The flat bar is a readily and commercially available product.

Force of Gravity: As used in this disclosure, the force of gravity refers to a vector that indicates the direction of the pull of gravity on an object at or near the surface of the earth.

Framework: As used in this disclosure, a framework refers to the substructure of an object that carries the load path of the object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Gusset: As used in this disclosure, a gusset is an angled structural member used to form a portion of the load path of a section of a framework. By angled is meant that the gusset is neither parallel nor perpendicular to the force of gravity.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Interior Screw Thread: An interior screw thread is a groove that is formed around the inner surface of a tube in the form of a helical structure that is used to convert rotational movement into linear movement.

Lateral: As used in this disclosure, the term lateral refers to the movement of an object that is perpendicular to the previously determined or expected direction of movement of the object. Lateral movement is always perpendicular to the anterior-posterior axis.

Load Path: As used in this disclosure, a load path refers to a chain of one or more structures that transfers a load generated by a raised structure or object to a foundation, supporting surface, or the earth.

Medial: As used in this disclosure, the term medial is used to describe the relative location of two objects. The medial object is: 1) the object that is closer to a previously specified center axis when the direction of comparison is the radial direction; and 2) the object that is closer to a center point on a center axis when the direction of comparison is in the lateral direction. This disclosure assumes that the center axis of an object is the axis that: 1) passes through the center of the object; in a direction that, 2) is parallel to the presumed direction of motion of the object.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Pedestal: As used in this disclosure, a pedestal is an intermediary load bearing structure that that transfers a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Pipe: As used in this disclosure, a pipe is a hollow prism-shaped device that is suitable for use in transporting a fluid. The line that connects the center of the first base of the prism to the center of the second base of the prism is referred to as the axis of the prism or the centerline of the pipe. When two pipes share the same centerline they are said to be aligned. In this disclosure, the terms inner dimension of a pipe and outer dimension are used as they would be used by those skilled in the plumbing arts.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk-like appearance. As defined in this disclosure, plates may be made of any material, but are commonly made of metal, plastic, and wood. When made of wood, a plate is often referred to as a board.

Platform: As used in this disclosure, a platform is a raised horizontal surface that forms a load path to support objects placed on the superior surface of the platform.

Posterior: As used in this disclosure, posterior is a term that is used to refer to the side of an object that is distal or in the opposite direction of the anterior side. When comparing two items, the posterior item is the item that is distal from the front of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rail: As used in this disclosure, a rail is a generic term that refers to a structure with a primary sense of direction that is perpendicular to the direction of the gravitational force.

Screw: As used in this disclosure, to screw is a verb meaning: 1) to fasten or unfasten (unscrew) a threaded connection; or 2) to attach a helical structure to a solid structure.

Sinister: As used in this disclosure, sinister is a directional reference that refers to the left side of the body or the left side of an object from the perspective of a viewer who is facing the posterior side of the object.

Spiral: As used in this disclosure, a spiral describes a locus of points within a plane moving around a fixed center wherein the locus of points moves monotonically increasing manner away from the center.

Superior: As used in this disclosure, the term superior refers to a directional reference that is parallel to and in the opposite direction of the force of gravity.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Threaded Connection: As used in this disclosure, a threaded connection is a type of fastener that is used to join a first tube-shaped and a second tube-shaped object together. The first tube-shaped object is fitted with a first fitting selected from an interior screw thread or an exterior screw thread. The second tube-shaped object is fitted with the remaining screw thread. The tube-shaped object fitted with the exterior screw thread is placed into the remaining tube-shaped object such that: 1) the interior screw thread and the exterior screw thread interconnect; and, 2) when the tube-shaped object fitted with the exterior screw thread is rotated the rotational motion is converted into linear motion that moves the tube-shaped object fitted with the exterior screw thread either into or out of the remaining tube-shaped object. The direction of linear motion is determined by the direction of rotation.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Truss Structure: As used in this disclosure, a truss structure is a framework in which the framework can be broken down into a plurality of triangular elements.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A celebratory apparatus comprising:
a plurality of rails, a platform, a tree support, and a plurality of threaded fasteners;
wherein the plurality of rails, the platform, the tree support, and the plurality of threaded fasteners are interconnected to form a supporting structure with the sled appearance;
wherein the plurality of rails forms a framework that provides vertical support;
wherein the platform is a horizontal surface that is raised above the supporting surface;
wherein the celebratory apparatus is configured for use with a Christmas tree;
wherein the celebratory apparatus is a structure that supports the Christmas tree;
wherein the celebratory apparatus has a structure with the appearance of a sled;
wherein the celebratory apparatus is further defined with a center axis;
wherein the tree support is a structure that supports the Christmas tree;
wherein the plurality of threaded fasteners is a threaded fastening system;
wherein the plurality of threaded fasteners secures the Christmas tree in the tree support;
wherein each of the plurality of rails is a truss structure;
wherein each of the plurality of rails is identical;
wherein the plurality of rails forms a vertical support structure that raises the platform above the supporting surface;
wherein the platform is a horizontal surface that forms the superior surface of the celebratory apparatus;
wherein the platform further comprises an aperture that allows the Christmas tree to insert through the platform into the tree support;
wherein the tree support supports the Christmas tree in a vertical orientation;
wherein the tree support receives the base of the Christmas tree through the platform;
wherein the plurality of threaded fasteners is a collection of fastening devices that secure the Christmas tree to the tree support;
wherein each of the plurality of threaded fasteners forms a threaded connection;
wherein each of the plurality of rails comprises a runner, a riser, a bow structure, a plurality of gussets, and a riser cant;
wherein the plurality of gussets attach the riser to the runner;
wherein the bow structure attaches to the anterior end of the runner;
wherein the riser cant is the angle formed between the runner and the riser;
wherein the runner forms the inferior boundary of each of the plurality of rails;
wherein the riser forms the superior boundary of each of the plurality of rails;
wherein the span of arc of the anterior riser cant equals the span of the arc of the posterior riser cant;
wherein the runner is a flat bar;
wherein the riser is a flat bar;
wherein the bow structure is a spiral structure formed on the anterior joint attaching the runner and the riser.

2. The celebratory apparatus according to claim 1
wherein the plurality of gussets forms a series of adjacent triangular structures between the runner and the riser;
wherein none of the plurality of gussets are perpendicular to the force of gravity;
wherein none of the plurality of gussets are parallel to the force of gravity.

3. The celebratory apparatus according to claim 2
wherein the plurality of rails further comprises a dexter rail and a sinister rail;
wherein the dexter rail and the sinister rail support the platform.

4. The celebratory apparatus according to claim 3
wherein the platform comprises a plurality of lateral beams, a plurality of medial beams, and a plurality of horizontal plates;
wherein the plurality of lateral beams and the plurality of medial beams combine to support the plurality of horizontal plates.

5. The celebratory apparatus according to claim 4
wherein each of the plurality of lateral beams is a flat bar that attaches the riser of the dexter rail to the riser of the sinister rail;
wherein each of the plurality of lateral beams are perpendicular to the riser of both the dexter rail and the sinister rail;
wherein each of the plurality of lateral beams are perpendicular to the center axis of the celebratory apparatus.

6. The celebratory apparatus according to claim 5 wherein each of the plurality of lateral beams are identical.

7. The celebratory apparatus according to claim 6
wherein each of the plurality of medial beams is a flat bar that attaches to two adjacent lateral beams selected from the plurality of lateral beams;
wherein each of the plurality of medial beams are perpendicular to each lateral beam selected from the plurality of lateral beams;
wherein each of the plurality of medial beams are parallel to the center axis of the celebratory apparatus.

8. The celebratory apparatus according to claim 7
wherein the plurality of horizontal plates forms the superior horizontal surface of the celebratory apparatus upon which the decorative items are placed;
wherein each of the plurality of horizontal plates is a plate structure;
wherein each of the plurality of horizontal plates are supported by two or more beams selected from the group consisting of: A) the plurality of lateral beams; B) the plurality of medial beams; or C) the combination of the plurality of lateral beams and the plurality of medial beams.

9. The celebratory apparatus according to claim 8
wherein the tree support comprises a tree stand and a pedestal;
wherein the tree stand attaches to the pedestal;
wherein the tree stand is a hollow prism-shaped pipe;
wherein the tree stand supports the Christmas tree such that the Christmas tree stands vertically from the tree stand in a perpendicular direction to the platform;
wherein the pedestal is a prism-shaped structure.

10. The celebratory apparatus according to claim 9
wherein the pedestal is geometrically similar to the tree stand;
wherein the span of the perimeter of the pedestal is greater than the span of the perimeter of the tree stand;
wherein the tree stand has a cylindrical shape.

11. The celebratory apparatus according to claim 10
wherein the plurality of threaded fasteners comprises a plurality of bolts and a plurality of threaded apertures;
wherein each of the plurality of threaded apertures is an aperture formed through the face of the tree stand;
wherein each of the plurality of threaded apertures is formed with an interior screw thread;
wherein each of the plurality of threaded apertures are identical;
wherein each of the plurality of bolts is a shaft that is formed with an exterior screw thread;
wherein each of the plurality of bolts is sized to screw into any threaded aperture selected from the plurality of bolts;
wherein each of the plurality of bolts are identical.

12. The celebratory apparatus according to claim 11
wherein the plurality of gussets comprises a first gusset, a second gusset, a third gusset, a fourth gusset, a fifth gusset, and a sixth gusset;
wherein the first gusset is a flat bar that attaches the runner to the riser;
wherein the second gusset is a flat bar that attaches the runner to the riser;
wherein the third gusset is a flat bar that attaches the runner to the riser;
wherein the fourth gusset is a flat bar that attaches the runner to the riser;
wherein the fifth gusset is a flat bar that attaches the runner to the riser;
wherein the sixth gusset is a flat bar that attaches the runner to the riser.

13. The celebratory apparatus according to claim 4
wherein the first gusset, the runner, and the riser forms a triangle within the truss structure of each of the plurality of rails;
wherein the sixth gusset, the runner, and the riser forms a triangle within the truss structure of each of the plurality of rails;
wherein the second gusset, the runner, and the third gusset forms a triangle within the truss structure of each of the plurality of rails;
wherein the third gusset, the riser, and the fourth gusset forms a triangle within the truss structure of each of the plurality of rails;
wherein the fourth gusset, the runner, and the fifth gusset forms a triangle within the truss structure of each of the plurality of rails;
wherein the fifth gusset, the riser, and the sixth gusset forms a triangle within the truss structure of each of the plurality of rails.

14. The celebratory apparatus according to claim 13
wherein the plurality of lateral beams comprises a first lateral beam, a second lateral beam, a third lateral beam, and a fourth lateral beam;
wherein the first lateral beam is a flat bar that attaches the dexter rail to the sinister rail;
wherein the second lateral beam is a flat bar that attaches the dexter rail to the sinister rail;
wherein the third lateral beam is a flat bar that attaches the dexter rail to the sinister rail;
wherein the fourth lateral beam is a flat bar that attaches the dexter rail to the sinister rail;
wherein the order of installation of the plurality of lateral beams from the anterior to the posterior of the celebratory apparatus is the first lateral beam, the second lateral beam, the third lateral beam, and the fourth lateral beam.

15. The celebratory apparatus according to claim 14
wherein the plurality of medial beams comprises a first medial beam and a second medial beam;
wherein the first medial beam is a flat bar that attaches to the first lateral beam and the second lateral beam;
wherein the second medial beam is a flat bar that attaches to the third lateral beam and the fourth lateral beam.

16. The celebratory apparatus according to claim 15
wherein the plurality of horizontal plates comprises a first horizontal plate, a second horizontal plate, a third horizontal plate, a fourth horizontal plate, and a fifth horizontal plate;
wherein the first horizontal plate attaches to the superior surfaces of the first lateral beam, the second lateral beam, the third lateral beam and the fourth lateral beam;
wherein the first horizontal plate is proximal to the dexter rail;

wherein the second horizontal plate attaches to the superior surfaces of the third lateral beam, the fourth lateral beam, and the second medial beam;

wherein the second horizontal plate is positioned between the first horizontal plate and the third horizontal plate;

wherein the third horizontal plate attaches to the superior surfaces of the first lateral beam, the second lateral beam, the third lateral beam and the fourth lateral beam;

wherein the third horizontal plate is proximal to the sinister rail;

wherein the fourth horizontal plate attaches to the superior surfaces of the first lateral beam, the second lateral beam, and the first medial beam;

wherein the fourth horizontal plate is positioned between the first horizontal plate and the third horizontal plate;

wherein the fifth horizontal plate is a decorative structure that attaches to the dexter rail, the sinister rail, and the first medial beam;

wherein the fifth horizontal plate is anterior relative to the first horizontal plate, the fourth horizontal plate and the third horizontal plate;

wherein the tree stand is positioned between the first horizontal plate, the second horizontal plate, the third horizontal plate, and the fourth horizontal plate.

* * * * *